(12) United States Patent
Taylor

(10) Patent No.: US 9,449,105 B1
(45) Date of Patent: *Sep. 20, 2016

(54) USER-CONTEXT-BASED SEARCH ENGINE

(75) Inventor: David C. Taylor, Mapleton, UT (US)

(73) Assignee: Google Inc., Mountain View, CA (US)

( * ) Notice: Subject to any disclaimer, the term of this patent is extended or adjusted under 35 U.S.C. 154(b) by 831 days.

This patent is subject to a terminal disclaimer.

(21) Appl. No.: 13/619,839

(22) Filed: Sep. 14, 2012

Related U.S. Application Data

(63) Continuation of application No. 11/500,607, filed on Aug. 8, 2006, now Pat. No. 8,429,167.

(60) Provisional application No. 60/706,261, filed on Aug. 8, 2005, provisional application No. 60/706,262, filed on Aug. 8, 2005.

(51) Int. Cl.
*G06F 17/30* (2006.01)
*G06F 17/00* (2006.01)

(52) U.S. Cl.
CPC ... *G06F 17/30867* (2013.01); *G06F 17/30737* (2013.01); *G06F 17/30864* (2013.01)

(58) Field of Classification Search
CPC .................. G06F 17/30867; G06F 17/30864; G06F 17/30737
USPC ......................................... 707/708, 739, 794
See application file for complete search history.

(56) References Cited

U.S. PATENT DOCUMENTS

| | | | |
|---|---|---|---|
| 4,922,414 A | 5/1990 | Holloway et al. | |
| 5,243,520 A | 9/1993 | Jacobs et al. | |
| 5,265,065 A | 11/1993 | Turtle | |
| 5,301,109 A | 4/1994 | Landauer et al. | |
| 5,321,833 A | 6/1994 | Chang et al. | |
| 5,331,556 A | 7/1994 | Black, Jr. et al. | |
| 5,404,505 A | 4/1995 | Levinson | |
| 5,469,354 A | 11/1995 | Hatakeyama et al. | |

(Continued)

FOREIGN PATENT DOCUMENTS

| | | |
|---|---|---|
| GB | 2 336 696 | 10/1999 |
| WO | WO-96/23265 | 8/1996 |
| WO | WO-98/26357 | 6/1998 |

OTHER PUBLICATIONS

"Using Domain Information for Word Sense Disambiguation" Magnini et al. (2001).*

(Continued)

*Primary Examiner* — Kannan Shanmugasundaram
(74) *Attorney, Agent, or Firm* — Foley & Lardner LLP; John D. Lanza

(57) ABSTRACT

A method and apparatus for determining contexts of information analyzed. Contexts may be determined for words, expressions, and other combinations of words in bodies of knowledge such as encyclopedias. Analysis of use provides a division of the universe of communication or information into domains, and selects words or expressions unique to those domains of subject matter as an aid in classifying information. A vocabulary list is created with a macro-context (context vector) for each, dependent upon the number of occurrences of unique terms from a domain, over each of the domains. This system may be used to find information or classify information by subsequent inputs of text, in calculation of macro-contexts, with ultimate determination of lists of micro-contests including terms closely aligned with the subject matter.

20 Claims, 4 Drawing Sheets

(56) References Cited

U.S. PATENT DOCUMENTS

| | | |
|---|---|---|
| 5,537,132 A | 7/1996 | Teraoka et al. |
| 5,576,954 A | 11/1996 | Driscoll |
| 5,642,502 A | 6/1997 | Driscoll |
| 5,642,519 A | 6/1997 | Martin |
| 5,649,186 A | 7/1997 | Ferguson |
| 5,655,116 A | 8/1997 | Kirk et al. |
| 5,664,115 A | 9/1997 | Fraser |
| 5,675,819 A | 10/1997 | Schuetze |
| 5,708,825 A | 1/1998 | Sotomayor |
| 5,724,571 A | 3/1998 | Woods |
| 5,737,619 A | 4/1998 | Judson |
| 5,754,939 A | 5/1998 | Herz et al. |
| 5,758,328 A | 5/1998 | Giovannoli |
| 5,781,879 A | 7/1998 | Arnold et al. |
| 5,784,608 A | 7/1998 | Meske, Jr. et al. |
| 5,794,207 A | 8/1998 | Walker et al. |
| 5,796,945 A | 8/1998 | Tarabella |
| 5,799,143 A | 8/1998 | Butt et al. |
| 5,832,435 A | 11/1998 | Silverman |
| 5,832,520 A | 11/1998 | Miller |
| 5,845,278 A | 12/1998 | Kirsch et al. |
| 5,848,410 A | 12/1998 | Walls et al. |
| 5,870,735 A | 2/1999 | Agrawal et al. |
| 5,873,079 A | 2/1999 | Davis et al. |
| 5,895,454 A | 4/1999 | Harrington |
| 5,900,005 A | 5/1999 | Saito |
| 5,901,287 A | 5/1999 | Bull et al. |
| 5,913,210 A | 6/1999 | Call |
| 5,915,236 A | 6/1999 | Gould et al. |
| 5,918,213 A | 6/1999 | Bernard et al. |
| 5,920,836 A | 7/1999 | Gould et al. |
| 5,924,105 A | 7/1999 | Punch, III et al. |
| 5,926,808 A | 7/1999 | Evans et al. |
| 5,937,422 A | 8/1999 | Nelson et al. |
| 5,946,488 A | 8/1999 | Tanguay et al. |
| 5,953,718 A | 9/1999 | Wical |
| 5,963,940 A | 10/1999 | Liddy et al. |
| 5,983,216 A | 11/1999 | Kirsch et al. |
| 5,983,221 A | 11/1999 | Christy |
| 5,999,925 A | 12/1999 | Evans |
| 6,006,221 A | 12/1999 | Liddy et al. |
| 6,018,733 A | 1/2000 | Kirsch et al. |
| 6,018,760 A | 1/2000 | Oishi et al. |
| 6,021,409 A | 2/2000 | Burrows |
| 6,023,697 A | 2/2000 | Bates et al. |
| 6,029,146 A | 2/2000 | Hawkins et al. |
| 6,029,165 A | 2/2000 | Gable |
| 6,047,390 A | 4/2000 | Butt et al. |
| 6,049,799 A | 4/2000 | Mangat et al. |
| 6,070,134 A | 5/2000 | Richardson et al. |
| 6,073,097 A | 6/2000 | Gould et al. |
| 6,073,167 A | 6/2000 | Poulton et al. |
| 6,112,186 A | 8/2000 | Bergh et al. |
| 6,125,352 A | 9/2000 | Franklin et al. |
| 6,175,830 B1 | 1/2001 | Maynard |
| 6,183,366 B1 | 2/2001 | Goldberg et al. |
| 6,229,825 B1 | 5/2001 | Nitta et al. |
| 6,260,077 B1 | 7/2001 | Rangarajan et al. |
| 6,289,342 B1 | 9/2001 | Lawrence et al. |
| 6,314,420 B1 | 11/2001 | Lang et al. |
| 6,397,209 B1 | 5/2002 | Reed et al. |
| 6,411,953 B1 | 6/2002 | Ganapathy et al. |
| 6,421,675 B1 | 7/2002 | Ryan et al. |
| 6,438,539 B1 | 8/2002 | Korolev et al. |
| 6,446,061 B1 | 9/2002 | Doerre et al. |
| 6,446,081 B1 | 9/2002 | Preston |
| 6,453,356 B1 | 9/2002 | Sheard et al. |
| 6,473,754 B1 | 10/2002 | Matsubayashi et al. |
| 6,675,159 B1 | 1/2004 | Lin et al. |
| 6,745,161 B1 | 6/2004 | Arnold et al. |
| 6,760,720 B1 | 7/2004 | De Bellis |
| 7,013,300 B1 | 3/2006 | Taylor |
| 7,113,917 B2 | 9/2006 | Jacobi et al. |
| 7,181,438 B1 | 2/2007 | Szabo |
| 7,251,637 B1 | 7/2007 | Caid et al. |
| 7,519,529 B1 | 4/2009 | Horvitz |
| 7,680,796 B2 | 3/2010 | Yeh et al. |
| 7,856,441 B1 | 12/2010 | Kraft et al. |
| 2002/0077997 A1 | 6/2002 | Colby et al. |
| 2002/0129341 A1 | 9/2002 | Hibdon |
| 2002/0198882 A1 | 12/2002 | Linden et al. |
| 2003/0023664 A1 | 1/2003 | Elmer |
| 2003/0144996 A1 | 7/2003 | Moore, Jr. |
| 2003/0212655 A1 | 11/2003 | Volcani et al. |
| 2004/0068552 A1 | 4/2004 | Kotz et al. |
| 2004/0167845 A1 | 8/2004 | Corn et al. |
| 2005/0288954 A1 | 12/2005 | McCarthy et al. |
| 2007/0033218 A1 | 2/2007 | Taylor |
| 2007/0106758 A1 | 5/2007 | Chi et al. |
| 2007/0255735 A1 | 11/2007 | Taylor et al. |
| 2007/0288503 A1 | 12/2007 | Taylor |
| 2008/0133716 A1 | 6/2008 | Rao et al. |
| 2011/0313854 A1 | 12/2011 | Taylor |

OTHER PUBLICATIONS

"Ranking and Selecting Synsets by Domain Relevence" Buitelarr et al. (2001).*

"Pattern Abstraction and Term Similarity for Word Sense Disambiguation" Strapparava et al. (Jul. 2004).*

Ashwin G Rao et al., "Experiments in Query Processing at LEXIS-NEXTS for TrEC-7" 10 pages.

Jussi Karlgren et al., "An approach for the extraction of information from heterogeneous sources of textual data", Knowledge representation meets databass, proceedings of the 4th KRDB workshop, Aug. 1997, pp. 1-7.

Notice of Allowance on U.S. Appl. No. 13/220,473 dated Apr. 29, 2013.

Office Action on U.S. Appl. No. 13/220,473 dated Jan. 30, 2013.

Office Action on U.S. Appl. No. 13/220,473 dated Mar. 15, 2012.

Scirus White Paper; How Scirus Works; updated Aug. 2004.

Xiaoli Li et al., Using Micro Information Units for Internet Search, proceedings of the eleventh international conference on information and knowledge management, 2002, pp. 566-576.

Yoshihiko Hayashii et al. "Searching text-rich XML documents with relevance ranking," ACMSIGIR 2000 workshop on XML an information retrieval, Jun. 28, 2000, 7 pages.

Karlgren, Jussi; Vector-Based Semantic Analysis using Random Indexing and Morphological Analysis for Cross-Lingual Information Retrieval; SICS Stockholm, www.sics.se/humle/Homeosemy.

Kwon, Oh-Woog; Kim, Myoung-Cheol; Choi, Key-Sun; "Query Expansion Using Domain-Adapted, Weighted Thesaurus in an Extended Boolean Model"; Center for Artificial Intelligence Research Department of Computer Science; Korea Advanced Institute of Science and Technology, ACM 1994.

* cited by examiner

USER-CONTEXT-BASED SEARCH ENGINE

RELATED APPLICATIONS

This application is a continuation of U.S. patent application Ser. No. 11/500,607 filed Aug. 8, 2006, which claims the benefit of U.S. Provisional Patent Application No. 60/706,261, filed Aug. 8, 2005 and U.S. Provisional Patent Application No. 60/706,262, filed Aug. 8, 2005, all of which are hereby incorporated by reference herein in their entities.

BACKGROUND

1. The Field of the Invention

This invention relates to a data extraction tool and, more particularly, to novel systems and methods for searching, organizing, and presenting information stored in electronic format.

2. The Background Art

In what is known as the information age, information is readily available electronically, through information repositories known as datastores and databases. Datastores are substantially unorganized collections of data, while databases are indexed in some fashion. The Internet, the world's largest database, has made available enormous quantities of information to anyone with a personal computer and Internet access. This can be very helpful for people who wish to learn about something or conduct business in the convenience of their own homes. However, it can also be tremendously time-consuming to locate a desired bundle of information among the millions available.

The Internet is organized only by the name of each web site. Each individual or group maintaining a web site decides how that web site will be organized. Thus, there is no official catalog of information available on the Internet. Anyone desiring information must hypothesize which web sites would be likely to have the desired data and navigate through those web sites according to the organization set up by the web site's operator. Although other databases and datastores are small, many exhibit the same organizational difficulties.

Some companies have developed portals to automate a portion of the search for information. Most of these portals are text-based. Currently available portals include search engines, and directories.

To use a search engine, a user provides a set of words to search for, and the search engine returns a list of "hits" or web sites containing those words. Search engines are advantageous in that they require little user input or understanding of the operation of the search engine. However, they can be difficult to work with for a number of reasons.

For example, the list may contain a vast number of hits, few of which actually relate to the desired piece of data. Conventional keyword searching returns any instance of the word being sought, regardless of the way the word is used in the web site. Although a user may add additional key words to narrow the search, there often is no combination of words that must be found together to exclude all irrelevant pages while keeping all relevant ones.

Also, many conventional search engines return only the home page of a web site that contains the keyword. It is then up to the user to find the keyword in a site and determine whether it is relevant. This requires a user to figure out how the site is organized and follow the right links. This can be difficult because there may be no links that clearly indicate where the keyword is.

The output from most search engines is simply a page of links to possibly relevant sites. A user may wish to supplement or rearrange the search results, but the way the results of a search are formatted typically makes addition or modification of criteria difficult or impossible.

Moreover, information obtained through a search often becomes outdated. Currently, a user must revisit previously found sites to determine whether the old information is still valid. Additionally, a user must perform a new search to locate any newly relevant sites and search through those sites for relevant information.

Directories function differently than search engines. Rather than search based on keywords provided by a user, most directories provide a user with an information scheme, often hierarchically organized. The user then chooses what type of information to search for, designating narrower groups of information with each choice. Ultimately, the user reaches the bottom level of the hierarchy and receives a list of links to information within that level.

Directories are advantageous in that information concerning a certain topic is typically grouped together. A directory probably will not inundate a user with information, but rather provide a few links believed to be important by the creators of the directory. Nevertheless, directories have drawbacks of their own.

For example, traditional directories contain information deemed of value by those who compile them. A user may have an entirely different view of what is important and what is irrelevant. A user may thus find that information he or she needs simply is not available on the directory.

Also, directories take time to navigate. A user must make a series of decisions to reach any useful information at all. Even then, a user may find it necessary to backtrack and choose a different route through the hierarchy. Since a user cannot fashion groupings of information, he or she may be required to view several branches of the hierarchy to obtain the full range of information he or she desires.

Moreover, if a user does not know how to classify the bit of information sought, he or she may not even he able to find it in the directory. For example, a user desiring to find the meaning of "salmonella" in a biological directory may spend great amounts of time looking through the "aquatic life" branch of the directory, without ever realizing that "salmonella" is more properly classified as "microscopic life." The more a user's view of how information should be organized differs from that of the directory's creators, the more difficult it will be for the user to find information in the directory.

Consequently, there is a need for a data extraction tool capable of providing many of the benefits of both search engines and directories, without drawbacks listed above. For example, there is a need for a tool that could reliably provide a list of highly relevant information locations based on a simple text query. Furthermore, such a tool should provide ready access to the exact location of the information. Preferably, the tool would supply the user with a list of locations or links that can be easily sorted and updated for the convenience of the user. Furthermore, the tool should not require that the user understand the configuration of the tool's internal databases.

In addition to the problems mentioned above, current searching methods are deficient in a number of other ways. Consequently, a more advanced data extraction tool may provide numerous benefits to those desiring to obtain information from a large datastore or database, such as the Internet.

BRIEF SUMMARY OF THE INVENTION

In view of the foregoing, in accordance with the invention as embodied and broadly described herein, a method and apparatus are disclosed in one embodiment of the present invention for determining contexts of information analyzed. Contexts may be determined for words, expressions, and other combinations of words in bodies of knowledge such as encyclopedias. Analysis of use provides a division of the universe of communication or information into domains, and selects words or expressions unique to those domains of subject matter as an aid in classifying information. A vocabulary list is created with a macro-context (context vector) for each, dependent upon the number of occurrences of unique terms from a domain, over each of the domains. This system may be used to find information or classify information by subsequent inputs of text, in calculation of macro-contexts, with ultimate determination of lists of micro-contests including terms closely aligned with the subject matter.

In one embodiment, databases of information may be mined to determine the macro-contexts and micro-contexts for any constituent size of information element. For example, web pages, groups of web pages, classification trees of web page content, or the like may be mined and analyzed to determine macro-context and micro-context appropriate to each. Thereafter, the database information may be indexed in accordance with the macro and micro-context.

Upon receiving a query from user, the query may be given contexts, both macro and micro-contexts based on the query alone, the query associated with other queries from the same user, the query associated with other information or query results from that user, or other inputs provided to, from, or about the user in order to give context. In one embodiment, the user may actually input documents and ask or request that the search engine find documents like it in subject matter. Ultimately, upon determining the macro and micro-context associated with the query, a search engine may locate in a database information having contexts that relate most closely with the contexts associated with the query. Presentation to a user may be in any format suitable for understanding by a user.

The disclosure of U.S. patent application Ser. No. 09/630, 753, filed Aug. 2, 2000 for USER-CONTEXT-BASED SEARCH ENGINE, is hereby incorporated by reference.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
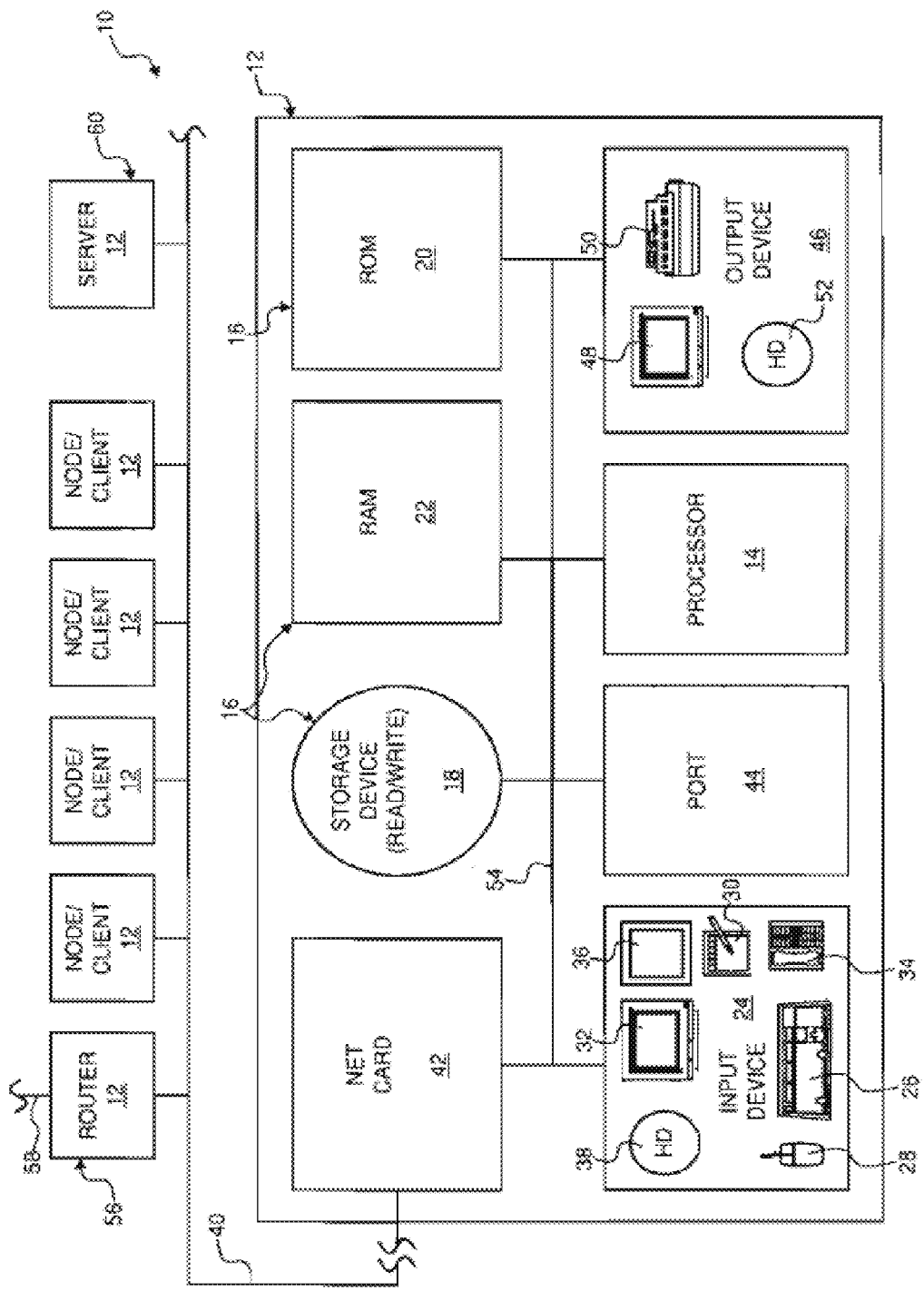
FIG. 1 is a schematic block diagram illustrating a computer system for executing certain methods and processes in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, an apparatus 10 or system 10 for implementing the present invention may include one or more nodes 12 (e.g., client 12, computer 12). Such nodes 12 may contain a processor 14 or CPU 14. The CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between the processor 14 and a user. A printer 50, a hard drive 52, or other device may be used for outputting information as output devices 46.

Internally, a bus 54, or plurality of buses 54, may operably interconnect the processor 14, memory devices 16, input devices 24, output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (i.e., network 40 and neighboring network 58), or may be separated by multiple routers 56 and multiple networks as individual nodes 12 on an internetwork. The individual nodes 12 may have various communication capabilities. In certain embodiments, a minimum of logical capability may be available in any node 12. For example, each node 12 may contain a processor 14 with more or less of the other components described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

Figure 2:
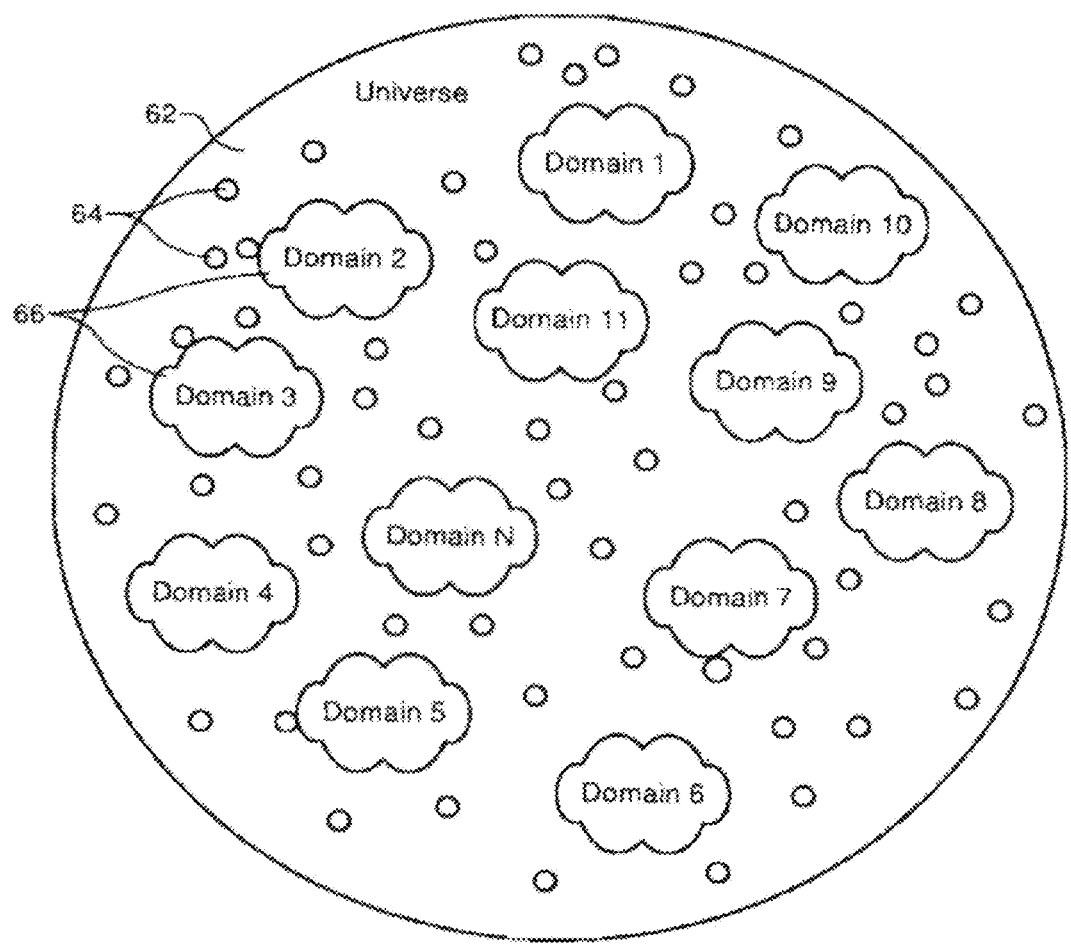
FIG. 2 is a schematic diagram of a universe of communication or information populated by various communication elements and domains of subject matter in accordance with the present invention.

Referring to FIG. 2, a universe 62 of communications exists. The universe 62 of communications has at an atomic level individual words. Words may themselves be terms of art or may be terms having independent meaning. Likewise, words may be combined in expressions that have meaning. Similarly, words may also be combined simply as words to have a meaning constituting a term.

For example, car is a word. Vehicle is a word. Truck is a word. Each of these has meaning. Nevertheless, a car may be an automobile driven by a individual. Likewise, a car may be a railroad car operated by only a railroad. Thus, different words have different contexts which give the individual words meaning.

Likewise, terms may be made from combined words. For example, a Ford car, a touring car, or the like may be a particular type of a car and may have individualized meaning because of the fact that the addition of another word creates yet another term and meaning.

Likewise, when considering expressions, many terms of art, and literary expressions may arise. For example, the expression "last minute" does not literally mean the last minute of anything. It is a figurative expression meaning late in some allocated period of time.

Thus, in general words, terms, expressions, and the like are part of the population of communication elements 64 in the universe 62 of communication. Of course, the universe 62 may expand into phrases, such as clauses of individual sentences or phrases that are longer strings of words having some type of meaning. Likewise, individual sentences may be thought of as a group of assertions or declarations, in which a verb constitutes or represents some type of activity or action, and associated therewith is a nominative actor responsible for the action, and possibly an objective term that represents some thing or person acted upon, or some property or characteristic of the actor tied thereto by the verb.

Above assertions may be entire quotations, or larger textual groups of words. In general, any element of the universe 62 of communications may take on, through a common usage recognized by some group, a meaning that can be recognized, documented, and used in searching, determining context, understanding intended meaning, and the like.

In general, communication elements 64, whether they be from the smallest (atomic) level, or the greatest (macroscopic) level, may exist and do exist in the communication universe 62. Whenever an individual or document uses a particular communication element 64, it is used in a context that will influence how that communication element 64 (e.g., word, term, expression, phrase, assertion, etc.) is to be interpreted.

Interestingly, some words in the English language, and other languages, pertain to many different areas of subject matter. Thus, one may think of the universe 62 of communication as containing numerous domains 66 of subject matter. For example, the various domains 66 in FIG. 2 refer to centers of meaning or subject matter areas. These domains 66 are represented as somewhat indistinct clouds, in that they may accumulate a vocabulary of communication elements 64 about them that pertain to them or that relate to them. Nevertheless, some of those same communication elements 64 may also have application elsewhere. For example, a horse to a rancher is an animal. A horse to a carpenter is an implement of work. A horse to a gymnast is an implement on which to perform certain exercises. Thus, the communication element 64 that we call "horse" belongs to, or pertains to, multiple domains 66.

In a method and apparatus in accordance with the invention, searching for a suitable response to a query submitted by a user to any search engine may be improved substantially over a simple matching of words in the body of information search. That is, in traversing the universe 62 of communications, searching by individual word elements within the communication element 64 reduces a search to the most basic atomic element 64 that can be assembled into communication. Thus, an individual word such as "the" is likely useless in a search. The word is so ubiquitous and adds so little meaning to an expression, that to search for it is to obtain substantially no useful output. Thus, other words or combinations of words that have more significance are more important for searching. Search engines, however, that simply search for groups of words and their existence are still comparatively clumsy and provide numerous results that are not related to the subject matter domain 66 that a particular user seeks. Typical search engines, require a user to continually refine the words used in a query, regardless of the actual subject matter context that the user is pursuing.

In an apparatus and method in accordance with the invention, a search engine process is developed that provides a deterministic method for establishing context for the communication elements 64 submitted in a query. Thus, it is possible for a search engine now to determine to which domain 66 or domains 66 a communication element 64 is "attracted." Since few things are absolute, domains 66 may actually overlap or be very close such that they man share certain communication elements 64. That is, communication elements 64 do not "belong" to any domain 66, they are attracted to or have an affinity for various domains 66, and may have differing degrees of affinity for differing domains 66. One may think of this affinity as perhaps a goodness of fit or a best alignment or quality alignment with the subject matter of a particular domain 66.

Figure 3:
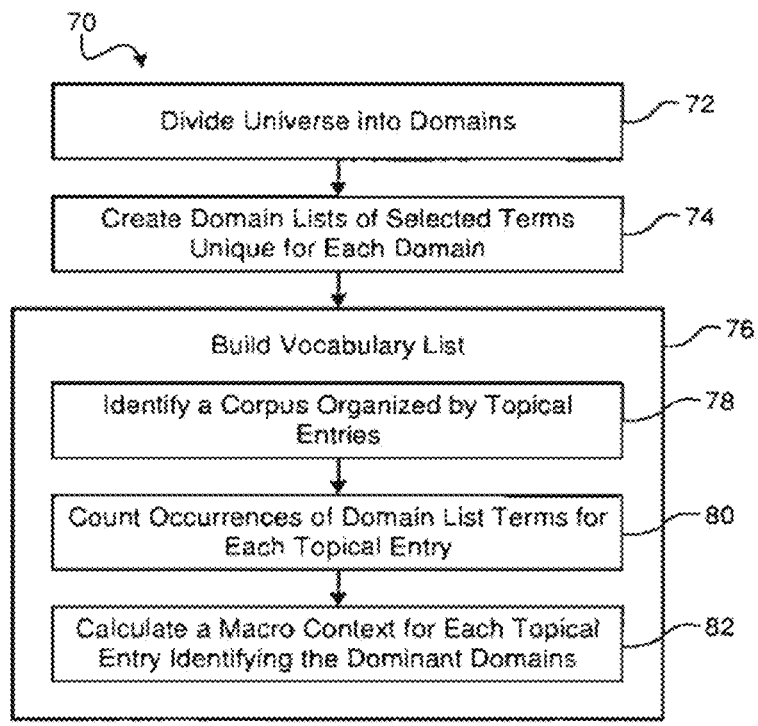
FIG. 3 is a schematic block diagram illustrating a method for determining a macro-context for an expansive set of communication elements in accordance with the present invention.

Referring to FIG. 3, context may be provided for various communication elements 64 in association with various domains 66 by an engine implementing a process 70. Such a process 70 may be performed by or in combination with an apparatus 10.

For example, one may divide 72 a universe 62 or a portion of a universe 62 of communication into various domains 66. Domains 66 may be selected by any suitable mechanism. Certainly every word or every individual communication element 64 is not its own domain. Likewise, dividing the entire universe 62 of information and communication into things plant, things animal, and things inanimate, may not be particular useful. Thus, somewhere between permitting every communication element 64 to be its own domain, and dividing the entire universe 62 of information and communication into three domains, one may select a degree of granularity that will be both computationally effective for searching, and contextually rewarding. In one embodiment of an apparatus and method in accordance with the invention, it has been found that a number of domains 66 on the order of about 100 or more has been found computationally effective and contextually rewarding for comparatively rapidly for searching.

By contextually rewarding is meant that the information to which the user is directed, or the information provided back in response to a query is comparatively closely related. Most contextually rewarding would be that information exactly which has been sought. Nevertheless, a little less contextually rewarding, but still useful would be information that is in the area and can still be useful. Contextually unrewarding would be information that shares the word in a completely different and useless context related to the query. The subject matter of domain 66 may include things like medicine, geographic regions of the world, sports, education, common activities, and the like.

Thus, once the universe 62 has been divided into some set of domains 66, one may create 74 domain lists of selected terms unique to each domain 66. That is, it has been found that although numerous words and other communication elements 64 serve double or other multiple duty for various domains 66, each domain 66 may have certain communication elements 64 that are substantially unique to itself. For example, in medicine, oncology is a field relating to cancer. Such a term does not have ubiquitous use in any field outside medicine. However, within the domain 66 of medicine, the word is used frequently.

This is another useful characteristic, frequency. That is, a communication element 64 such as an individual word or expression that is used frequently, and exclusively within a particular field or subject matter domain 66, is particularly well suited for selection as one of the domain list terms.

Typically, a domain list of about 40 to 50 terms have been found to be effective. Some domain lists have been operated successfully in an apparatus and method in accordance with the invention with as few as 10 terms. Some domain lists may contain a few hundreds of individual terms. For example, some domains 66 may justify about 300 terms. Although the method 70 is deterministic, rather than statistical, it is helpful to have about 40 to 50 terms in the domain list in order to improve the efficiency of the calculations and determinations of the method.

The domain lists have utility in quickly identifying the particular domain 66 to which their members pertain. This results from the lack of commonality of the terms and the lack of ambiguity as to domains 66 to which they may have utility. By the same token, a list as small as the domain lists are necessarily limited when considering the overall vocabulary of communication elements 64 available in any language. Thus, the terms in domain lists do not necessarily arise with the frequency that is most useful for rapid searching. That is, a word that is unique to a particular subject matter domain 66, but infrequently used, may not arise in very many queries submitted to a search engine.

A process 76 for creating a vocabulary list of a substantial universe 62 or a substantial portion of a universe 62 of communication elements 64 may be performed by identifying 78 a body or corpus of information organized by topical entries. Thereafter, the text of each of those entries identified 78 may be subjected to a counting process 80 in which occurrences of terms from the domain list occur within each of the topical entries. Ultimately, a calculation 82 of a macro context may be made for each of the topical entries. This calculation is based on the domain lists, and the domains represented thereby.

To identify a body or corpus of information, one may look to various reference books. For example, an encyclopedia of computer terms may provide a vocabulary for people dealing in that particular portion of the universe 62. Likewise, a general encyclopedia of public knowledge may be considered a corpus. Similarly, a dictionary has a certain aspect of organization in a regular format by toxical entries. Nevertheless, a dictionary may be somewhat antithetical to the concept of body of knowledge in that the entries are typically very short, and many and each is a different context.

For processing, an apparatus 10 (e.g., computer 10, computer network 10) may look for words. Accordingly, the corpus of information should be put in some type of a digital format. For example, a digital copy of a document, a digital on-line encyclopedia, a digital reference book, or the like may form a corpus of interest.

Counting 80 may be done by an apparatus 10 simply searching for terms found in the domain lists of the domains 66 into which the universe 62 has been divided. The terms may be individual words, terms, expressions, phrases, and so forth. Likewise, an individual word may be reviewed and counted as a word, and also counted in a expression. Similarly, in an assertion such as a subject, verb, and object, each individual word may be counted as a word. Likewise, the assertion, if it has formed a term found in a domain list, may also be treated in its entirety as an element 64 to be counted.

Counting, in one embodiment of an apparatus and method in accordance with the invention may involve selecting the topical entry, and for that entry, identified by the title, or expression being described, counting the occurrence of every term from every domain list available. Once the count has been made for an entry, a calculation 82 of the macro context for that entry may be made.

One may think of a topical entry as a vocabulary term. That is, every topical entry is a vocabulary word, expression, place, person, etc. that will be added to the overall vocabulary. That is, for example, the universe may be divided into about 100 to 120 domains 66 for convenient navigation. Likewise, the domain lists may themselves contain from about 10 to about 300 select terms each. By contrast, the topical entries that may be included in the build 76 of a vocabulary list may include the number of terms one would find in a dictionary such as 300 to 800,000. Less may be used, and conceivably more. Nevertheless, unabridged dictionaries and encyclopedias typically have on this order of numbers of entries Referring to FIG. 4, a macro-context 90 may be represented as a vector 90. One may also think of the macro-context 90 as a set of ordered pairs. That is, for a first category 92, every individual domain 66 identified may be listed. Thus, the individual entries 94 correspond to the different domains 66 into which the universe 62 has been subdivided. The second category 96 is an occurrence or a weight 96. Thus, each individual entry 98 represents a waiting for a particular domain entry 94. The resulting matrix is one example of how to create a macro-context 90. In this embodiment, in accordance with the invention, all of the domains 66 are represented by numbers 1, 2, 3, 4, 5, etc. in the entries 94. The weighting entries 98 represent the number of occurrences of the domain list words or terms created in the creation step 74. As a practical matter, the total number of occurrences of all domain list terms from a particular domain 66 are represented in a single entry 98. Actually, every single domain list term could be listed in a matrix of weights 96 in the macro-context 90. However, this adds much additional computation later, and actually can inhibit rapid searching. That is, by narrowing the granularity to a too-fine level of scrutiny, searching may be less likely to find or match a particular domain 66. Moreover, computations go up geometrically with the number of elements that must be processed. In the simplified approach illustrated in FIG. 4, the macro-context 90 may be readily calculated by a series of simple weighting entries 98 corresponding to respective domain identifiers 94.

Moreover, the macro-context 90 may be further reduced by limiting the particular entries 94 or domain identifiers 94 to the top 10 or 20 weight values 98. Accordingly, zeros would disappear, and the highest numbers in the entries 98 would be selected. In one embodiment, the greatest ten weights 98 and their associated domain numbers 94 are laid into a vector or matrix. If one thinks of all the domain numbers 94, then the weights 98 may be a vector, in that all the domain numbers are identical, and complete, and the matrix is sparsely populated by the top ten values of weights 98, and all other weights are set to zero. That is, a macro-context 90 may be thought of as a weight vector 96 including the weight for every available domain number 94. Meanwhile, the weight vector 96 is a sparse matrix or sparse vector in which all values are set to zero except the greatest ten or other number of entries 98.

Figure 4:
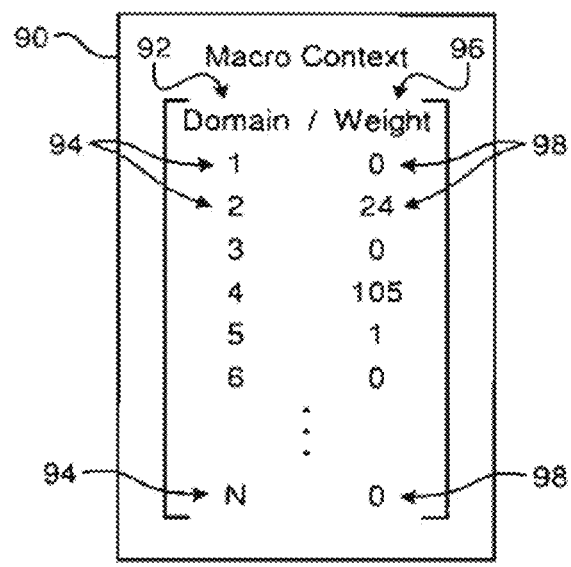
FIG. 4 is a schematic block diagram illustrating one embodiment of a macro-context matrix or vector in accordance with the present invention.

In the example of FIG. 4, the domain 66 associated with the domain identifier "1" has no term from its domain list occurring in the topical entry identified in the macro-context 90. The domain 66 identified by domain identifier "2" has 24 total occurrences of domain list of terms. This number of 24 may represent a single term multiple times, 24 separate terms from the domain list each occurring once, or any combination there between. Thus, each occurrence of each term may be counted as a weight value of 1. Other weighing schemes may be used in accordance with mathematical theories available for numerical methods. For example, each term could be given away. Nevertheless, such complexities have not been found to be necessary, and computational speeds are improved by simplicity.

For each topical entry or vocabulary term, a macro-context vector 90 may be created. Thereafter, the unique vector for that entry may be used by applying it to various inputs provided by searchers. In general, an input may be from any source. Typically, an input may result from the terms of a query. Nevertheless, an input may also be not only the terms or words used in a query, but an extensive discourse or freeform paragraph describing what a person is searching for. Likewise, inputs may include all previous text inputs from a particular user.

Likewise, an input may include information to be characterized or classified. That is, a query from a searcher is classified in order to select information qualifying to respond to the query. By the same token, additional resources on the Internet to be classified as responses to be delivered may also be classified.

Figure 5:
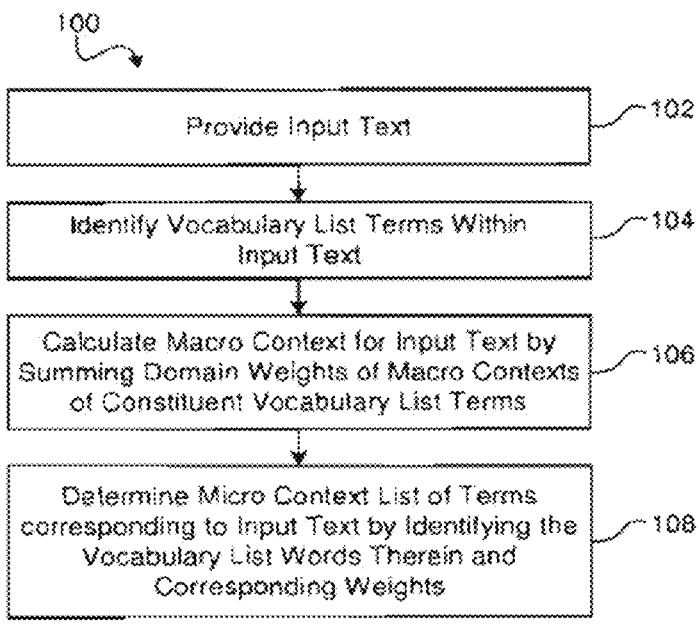
FIG. 5 is a schematic block diagram illustrating a method for determining the macro and micro-contexts of an input text in accordance with the present invention.

Referring to FIG. 5, a process 100 for determining context of an input may include providing 102 some type of input. Typically, the input will be provided 102 as text. That is, a digital string of characters that may be processed. Typically, since human beings communicate in language, information is typically predominantly text corresponding to words, with interspersed numbers and the like. Thus, providing an input text 102 may include providing the body of a web page to be characterized, providing a query from a user to be responded to, providing the entire query history of a user in order to provide some indication of the proper context for responding to a current query from a user, or the like. Likewise, a user could be characterized by not only the previous queries submitted by that user, but by the responses to previous queries of that user.

In one embodiment of an apparatus and method in accordance of the invention, a user may browse the Internet. Browsed pages may be provided 102 for evaluation, along with the queries that gave rise to those. Thus, one may begin to obtain information to either classify information that will eventually be searched (e.g., providing 102 input text corresponding to something published on the internet, or may be provided 102 from inputs associated with a searcher.

An identification step 104 may create a vocabulary list of terms from the input text. That is, for example, the input text provided 102 may be parsed to find individual communication elements 64 such as words, terms, expressions, phrases, and the like that occur within the inputs provided 102. In order to recognize that a communication element 64 is a recognized term of some type, that communication element 64 must exist in some recognizable form. That is, a string matching may be done. However, in an apparatus and method in accordance with the invention, one method for providing useful identification of terms is to compare the various communication element 64 with the vocabulary list that was provided during the build process 76. Thus, all the occurrences of any communication element 64 within the list resulted from the vocabulary build 76 may be identified for its number occurrences within the input text.

Once the individual terms have been identified, then a calculation 106 may calculate the macro-context for the input-text. In contrast to the building process 76, in which the macro-context 90 was created for each vocabulary entry, the calculation step sums the domain weights 98 from the macro-context vector 90 of each of the terms from the input text, according to those terms macro-contexts 90 in the original vocabulary list. Accordingly, in one embodiment, the macro-context of an input may be a composite superposition or addition of the weights 98 of the macro-context vector 90 for all of the terms from the vocabulary list found in the input text.

Another way to think of the calculation step 106 is that one may take all the macro-context vectors 90, and particularly the weight vector 96 for each term out of the vocabulary list from the build 76 that has been found within the input text provided 102. These vectors may be thought of as sparse vectors 96 in which some of the weights are zero and some have values. As discussed above, for example, the vectors 96 corresponding to the various vocabulary terms from the build 76 that appear in the text provided 102 may be lined up and have the top ten weights 98 valued and all other weights set to zero. Accordingly, once lined up, all the vectors may be added to provide a new vector with all of the summed values for all of the weighting entries. Thus, the macro-context vector 90 corresponding to the input text provided 102 is this new summation vector. Thus, one may determine or calculate 106 a macro-context 90 corresponding to the input text provided 102.

In some instances, various strings of characters may exist in an input text provided 102 that do not match any vocabulary entry from the build 76. According, these will not affect the calculation. Such terms may include, for example, long strings of numbers. Likewise, foreign words not in common usage may be included. Likewise, various grammatical construction terms such a definite and indefinite articles may be filtered out or not included in the vocabulary, as being words that are too ubiquitous to be significant in any domain.

The process 100 may then use a deterministic mathematical process for determining a micro-context. A micro-context may be a list of terms selected from the vocabulary list created in the build 76. The list of terms is constructed by determining 108 the entries from the vocabulary list in the build 76 that are most closely aligned with the input text provided 102. This may be done in one of several ways. For example, the weight vector 96 vor any term of the vocabulary list may be multiplied (e.g., as a dot product) by the macro-context 90 of the input text. This may be done for each of the vocabulary entries found in both the input text and vocabulary list.

Various numerical methods may be used for comparison. One very simple method is to simply multiply the macro-context vector for the input text provided 102 against that of each of the terms in the vocabulary list that are found therein. If desired, this may be normalized by dividing by the multiplication of the weight vector 96 or macro-context 90 of the vocabulary entry against itself. Other types of fit routines, comparison routines, correlation routines and the like may be used in order to determine which vocabulary entries from the build 76 provide the highest values of the dot product from multiplication value of the two vectors. Accordingly, those vocabulary entries that have the highest values may be provided in a list. In one embodiment, determining a micro-context list involves selecting the best aligned or highest valued correlations to pick the most closely aligned vocabulary entries for the list of the determination step 108. Typically, it has been found in one embodiment of an apparatus and method in accordance with the invention that 256 most closely aligned vocabulary entries, identified with associated weightings, form a suitable micro-context for the input text provided 102.

Figure 6:
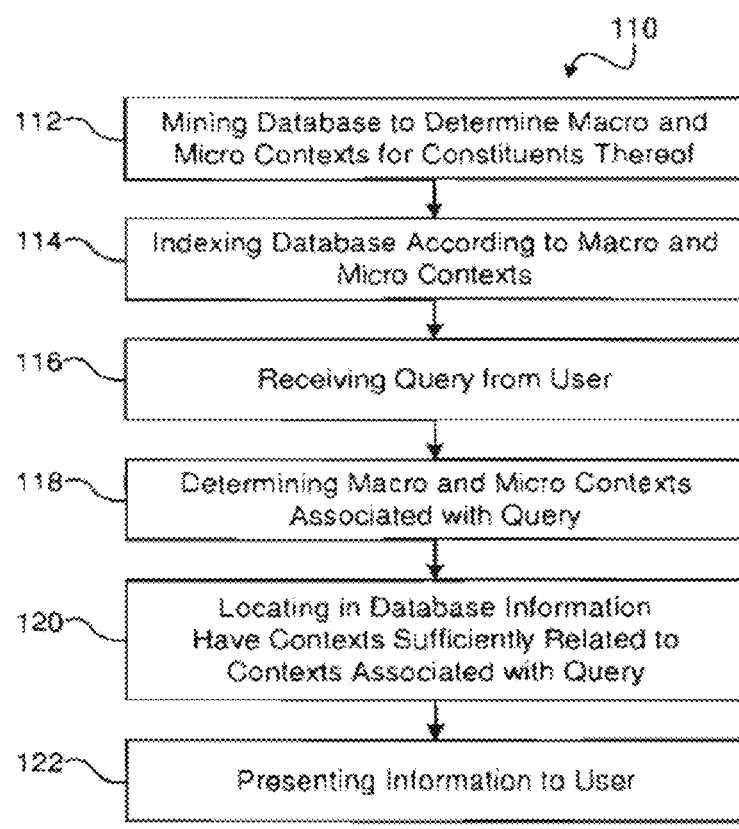
FIG. 6 is a schematic block diagram illustrating a method for contextually searching a database.

Referring to FIG. 6, a process 110 or method 110 for searching a database of information may include mining 112 a database or other repository of information to determine macro and micro contexts for constituent elements thereof. For example, any constituent element of a database or information repository may simply be an identifiable portion thereof. In a database, a constituent may be a record. In a record, a constituent may be a particular field of text. Nevertheless, in a database a record may be a particular level. For example, the Internet contains a great amount of information simply published on individual web pages. Thus, a web page, a web site, or a group of web pages grouped on a web site under a particular heading may all be considered a particular input text to be provided 102 as a recognizable entity. Thus, for example, an apparatus and method in accordance with the invention may characterize a web page, a group of web pages within a particular sub-category on that web site, or the entire web site in accordance with the processes disclosed herein above.

Following mining 112 of information, indexing 114 may involve sorting, classifying, filtering, or otherwise organizing information according to values of the macro-contexts thereof, or according to the word lists or terms lists found in micro-contexts. For example, content mined 112 may be organized according to all the micro-contexted terms that have the highest values. For example, the highest 10, 20 or 256 terms used may all be tags under which such a content would be indexed. Likewise, content from a location that has been mined 112 may be indexed 114 according to the shape and values of entries 98 in the macro-context vector 96.

Upon receiving 116 a query from user, the process 110 may determine 118, the macro and micro-context associated with the query. The query itself may be used as an input text 102 as described above in order to determine these contexts. Alternatively, all the queries submitted previously by that particularly user may also be included as input text provided 102 in order to determine 118 these contexts. Also, as described herein above, browsing results or search results previously provided in a response to queries from the user may all be used as part of the input text provided 102 in order to associate with the query some appropriate context. In one embodiment, a user may even donate to a search engine other material for which the user desires like information. This may include articles, web pages, or other information that the user has in digital format for submission to the process 110 in order to indicate that more of this type of material is desired.

Locating 120 in a database of information entries or information that has a context sufficiently related to the context associated with the query may be done by any simple method. For example, macro and micro-contexts for a query may be compared and matched. Once located, such information may be presented 122 to a user.

Example Embodiment I

This embodiment of the invention relates to the field of on-line advertising, especially as it relates to personalization and sense analysis for advertisers' web sites. A big problem with the pay-per-click models used in online advertising is that they can be spoofed by people who are interested in costing online advertisers money instead of finding out more about their products. The present invention provides a system to certify that the user who is clicking though on the ad or link actually has a history of looking at similar domains in the past. With this history, or personalization profile, the user interaction rises to the level of "certified click."

Every online advertisement has a destination URL. Each of these URLs can be semantically classified using a numerical vector that specifies membership in each of some number N of domains. For this invention, a domain can be defined as a partition of some semantic space of interest, where the partition is defined using an enumeration of semantic entities that occur exclusively or primarily in that part of the overall space. A URL can be considered to belong strongly to that domain if it contains a significant number of the semantic entities that make up that domain. Conversely, a URL would be considered to belong weakly or not at all to a domain if it contained few or none of the semantic entities used to define that domain.

Similarly, a person can be assigned a membership vector to the same set of domains simply by examining their search and click history. Since every URL or even entire web site can be assigned a vector, assigning a person a similar vector is accomplished by simply combining the vectors from the sites they visit in some way. This combination could occur in many different ways, including (but not limited to) averaging, averaging with hysteresis, weighted combination, or noise-adding averaging. This vector created for a person is called a "personalization vector."

With a personalization vector and a vector for every web site. The user's personalization vector and a site's vector can be multiplied together using a dot product, a weighted dot product, or some other method, resulting in a match value M. The advertiser can select a matching threshold T, where if a user coming into the target site has an M that exceeds the T, a certified click is generated. This certified click may motivate greatly increased ad rates for the hosting site, or may be used to measure other things relating to marketing effectiveness.

Systems in common use today capture only the number of clicks made on an ad link, or at best the number and source of those clicks. The back end of this system measures all this as well as the quality of each click. Using simple tagging measures commonly utilized today, a correlation can be developed between the conversion rate at the target site and the click quality from the tagged sources. Modifications to the matching function can then be made using a procedure similar to one layer back propagation in neural networks, allowing optimization for any set of domains. A side effect of this is that it is possible to measure the utility of each of the domains selected for the semantic space based on the weights found for each domain after the propagation phase.

The present embodiment of the invention gives the user a new way of measuring the quality of visitors to their websites, where quality is a measure of the match between a visitor's demonstrated interests and the content of the web page. It relies on three constructs—partition of a semantic space into a set of domains, definition of those domains in terms of semantic entities, and a mechanism to construct and maintain a picture of a given user with respect to one of more sets of domains.

Partitioning a semantic space into a set of domains is a manual process. To do this, a domain expert may delineate the semantic loci in the space. Mathematically speaking, it does not matter what the domains are called or even what their relative size is in terms of a random training set being assigned as members—it only matters that a partition is made that can be well-separated with a finite list of semantic entities, such that any semantic entity is a member of a very small fraction of the domains and each domain has many such entities.

Semantic entities can be anything from simple keywords to semantic constructs, which are assertions that are made up of simpler entities tied together with rules. The only constraint on a semantic entity is that it can be extracted from some sequence of combinations of raw text. In most cases, the set of semantic entities used to represent a domain is derived from a list of master assertions commonly answered by text in the domain. For example, if the domain in question is Breast Cancer, one question that is commonly answered is what stage of cancer a patient is generally at. By compiling a list of domain-specific questions, it is possible to (1) specify differences between very similar domains with great precision, and (2) create a rapid way to prototype a domain that does not require many hours of an expert's time, and can be expanded by relatively inexperienced people.

Where it is only necessary to classify a piece of text rather than extract actual values for the assertions in the domain, the master assertions can be "factored" into their simplified descendants and those which are common to a large percentage of the domains in question can then be removed, leaving (mostly) a list of keywords and phrases to define a domain. This speeds the comparison and classification processes tremendously.

The mechanism to create and maintain a domain-based picture (or sense-based picture) of a user can be as simple as a cookie stored on the user's machine that is used to update a user vector stored in a central database. This only functions when the user is surfing through sites that participate in the personalization system. Another slightly more complex implementation is something like a Browser Helper Object (BHO) that runs on the user's machine and watches/categorizes all surfing activity. With this system, even non-participating sites can contribute to the picture of the user, and any clicking the user does to ad sites served by certified clicks will pick up a much more comprehensive picture.

The system starts with zero knowledge about the user. When the user begins browsing, either through a participating site or by initializing the BHO, a new record is created in the database for that user. Every time the user clicks on a link, the contents of the returned page are used to update the picture of the user in the manner summarized above. The user may control the image being built up, or may even create multiple images of him or herself and select which image is presented as the current valid representation of the user's state. These images, or "aspects," represent the different roles that a given person might take on during the course of time. For example, a person might have a business aspect, wherein they are looking for things like printers, software, and computers, and a vacation aspect, where they are searching for good tours through Chile and Argentina. Once aspects are created by the user, browsing activity can be automatically assigned to the correct aspect simply by doing a global domain count match between the current site and all available aspects. Similarly, the user's current aspect or role can be inferred from the sites being browsed.

Updating of aspects or core personalization attributes can happen each time a different site is visited, or on a more delayed basis (in the case where the user is running the BHO). Historical data may be maintained, however, it is not needed as the hysteresis maintains an implicit history.

Sites that implement a certified clicks program need only query the central database to resolve the identity of a user's aspect and verify a sufficiently close match. The provided information can be additionally used to customize the receiving site for the incoming user, based on ancillary interests the user might have.

Example Embodiment II

This embodiment of the invention relates to the field of text processing, specifically to the fields of semantic analysis and text classification. Semantic analysis of a block of text has the primary goal of extracting meaning, or manipulatable assertions, from the combination of words that make up the text. The extracted assertions may not be explicitly present in the text, and may need to be inferred from a body of prior experience. One of the most important problems that must be solved before non-explicit assertions are made about the text is that of domain identification. The present invention addresses that problem.

A domain can be defined as a set of base assertions that apply for a given situation, for example, when we are talking about music, we can state that notes, rests, harmony, and other music-related rules are important. We can talk about artists, songs, and genres. We can assume that the rules and constraints of the music publishing industry are important. In short, before the first word of the text is processed, we can state many facts with certainty and ask many questions, the answers to which may or may not be found in the text.

Solutions to the domain identification problem fall into several categories: Keyword-based solutions, mathematical or statistical solutions, and rule-based solutions are the major categories for these solutions.

Keyword solutions are probably the most commonly used. Domains are represented by lists of keywords or key phrases that are more likely to occur in that particular domain than in any other domain. By explicitly specifying a domain through the use of manually selected keywords, a relatively good approximation to the domain may be achieved, unless discrimination is being attempted between two different domains that share the same vocabulary (without regard to meaning).

Mathematical and statistical solutions rely on properties of large sets to provide an automatic discrimination function between domains of interest. These types of solutions require the user to pre-classify blocks of text, often numbering in the thousands. These pre-classified blocks of text are then used as a training set for the system. Statistical calculations are run against all possible tokens and phrases, and those with the highest discrimination value are retained for use in classifying future inputs.

Rule-based solutions require manual construction of rules, which are run against the blocks of text to be classified. When enough rules are satisfied in a given domain, the block of text is assigned to that domain. Assignment may occur to multiple domains, or to the domain that satisfies the most rules.

One big problem that all of the existing systems have is that domains simply cannot be specified with sufficient precision to allow discrimination between two arbitrarily close domains. For example, if users require text domain segmentation between two types of computer programming message boards, where one deals with databases and the other deals with networks, both boards will use almost all of each other's keywords and key phrases. Similarly, mathematical approaches will not be able to automatically find discrimination functions because of the low granularity of the domain space.

A second and more significant problem is the large degree of manual intervention required to create a single domain in many of the stated approaches. Experts that know the domain are required to painstakingly select pertinent phrases in the keyword approaches, or manually discriminate between every text fragment in the training sets in the mathematical cases.

This embodiment of the invention gives the user a new way of specifying domains that is much more efficient than the existing methods. A significant effect of this new method of representation is the creation of a new way of representing the domain itself, as a set of slots to be filled, rather than a list of rules or keywords.

The domain representation system uses a list of assertions commonly answered by text in the domain to specify the domain itself. For example, if the domain in question is Breast Cancer, one question that is commonly answered is what stage of cancer a patient is generally at. By compiling a list of domain-specific questions, it is possible to (1) specify differences between very similar domains with great precision, and (2) create a rapid way to prototype a domain that does not require many hours of an expert's time, and can be expanded by relatively inexperienced people.

Verifying whether or not a block of text answers a specific question is a task for extractors. Extractors are a hierarchical rule-based system in the form of a DAG whose leaf nodes consist of simple token identifiers, whose middle level nodes consist of token combination operators, and whose top levels consist of assertion generators. When text is input to this system, it is broken up into a sequential list of tokens which activate the leaf nodes of the extractor system. Those leaf nodes then activate higher level nodes using a neural network-like system of activation thresholds and mutual enhancement/suppression links. That process continues until no further nodes are activated or suppressed. The result is a representation of the text in assertion form, which can then be matched to the list of assertions previously generated for each domain of interest. The domain with the most slots filled by the generated assertion is selected as the domain for the text, and the unfilled slots in the domain list can be iteratively filled by pushing back down through the assertion graph and inferring vacant nodes from the master domain.

An important part of this embodiment of the invention is the processing of text through the extraction DAG and the matching of the generated assertions with the core domain assertions. The user supplies a specification of the domain using a piece of software that outputs those assertions in a normalized format. One such specification is where assertions are specified as declarative sentences, and users designate the name of the assertion and the value slot using the programmatic interface. The assertion name is inserted into a database for use by the extractor builder.

The extractor builder is another piece of software that allows the user to select from the list of assertions for all domains and create relationships between tokens that designate both the existence of the assertion in a block of text as well as the format and location of the value needed to complete the assertion. Such relationships may include, but are not limited to adjacency, font size, paragraph length, verb type coexistence, voice, tense, keywords, key phrases, or numerical values. Users can also specify exceptions to these relationships, and use modifications against existing relationships to create new relationships in the extractor structure.

Once a domain and an extractor structure are fully specified, the system can be run against arbitrary blocks of text. The text is stripped of all unneeded information and all possible nodes in the extractor structure are activated. The result is a list of assertions with associated values. The domain with the most active assertions is reported as the selected domain. Those assertions which belong to the selected domain provide their extracted values as the extracted semantic content for that block of text. The next step is to infer additional semantic content to the block of text by force-activating all remaining assertions in the domain and looking for unused values at the token level that are not prohibited by extractor structure rules from filling those slots.

One aspect of this embodiment of the invention (among many) is extraction of factual and emotional content from on-line message boards and blogs. The system can be programmed to seek out internet sources that belong to a given domain, and then extract information of interest to that domain and insert the results in a conventional database. These results can then be used to generate reports for marketing, brand identification, or other purposes. They can also be used to measure the effectiveness of ad campaigns or the effect of news stories about certain products or events. Analysis by demographic can be accomplished, where demographic extractors are supplied with the domain.

The present invention may be embodied in other specific forms without departing from its spirit or essential characteristics. The described embodiments are to be considered in

What is claimed and desired to be secured by United States Letters Patent is:

1. A method for classifying information, the method comprising:
providing input text;
identifying a vocabulary list independent from the input text, the vocabulary list comprising a plurality of entries, each of the plurality of entries associated with a macro-context, wherein the macro-context comprises a vector characterizing the context of the entry by mapping a plurality of subject matters, each unique, to a corresponding plurality of weights, each weight reflecting a contribution of a corresponding subject matter of the plurality of subject matters to the entry;
counting occurrences of each term from the vocabulary list found within the input text;
calculating a macro-context representing summations of the macro-contexts associated with the terms from the vocabulary list found within the input text to characterize the context of the input text by mapping the plurality of subject matters to corresponding weights reflecting contributions of corresponding subject matters of the plurality of subject matters to the input text; and
determining a micro-context comprising a list of terms selected from the list of vocabulary that correspond to the input text.

2. The method of claim 1, further comprising reducing the list of terms in the micro-context by selecting those terms having macro-contexts most closely aligned with the macro-context of the input text.

3. The method of claim 1, wherein determining a micro-context comprises identifying, from the plurality of entries, entries having a macro-context within a selected mathematical proximity to the calculated macro-context.

4. The method of claim 1, wherein the plurality of entries comprises a plurality of topical entries, each entry of the plurality of entries corresponding to a topical entry of the plurality of topical entries.

5. The method of claim 1, wherein the macro-context of each of the plurality of entries reflects the counted occurrences.

6. The method of claim 1, wherein determining a micro-context further comprises calculating a multiplication of at least two macro-context vectors to provide a mathematical value reflecting a correspondence of a query with a vocabulary list of topical entries.

7. The method of claim 1, wherein each of the plurality of entries comprises at least one of a word, a name, or a phrase.

8. The method of claim 1, providing input text comprising at least one of providing a body of a web page to be characterized, providing a query from a user, or providing a query history of a user, the query history including previous queries submitted by the user and responses to the previous queries of the user.

9. The method of claim 1, further comprising classifying the input text according to at least one of the macro-context or the micro-context.

10. A method for searching comprising:
mining a repository of information to determine macro and micro-contexts for elements of a database, each macro and micro-contexts characterizing the context of an element of the database by mapping a plurality of subject matters, each unique, to a corresponding plurality of weights, each weight reflecting a contribution of a corresponding subject matter of the plurality of subject matters to the element of the database;
indexing the database content according to the macro and micro-contexts determined;
receiving a query from a user;
determining macro and micro-contexts associated with the query, the macro and micro-contexts characterizing the context of the query by mapping the plurality of subject matters to corresponding weights reflecting contributions of corresponding subject matters of the plurality of subject matters to the query;
locating in a database information having contexts related to contexts associated with a query; and
presenting the information located to a user.

11. The method of claim 10, wherein the repository comprises the database.

12. The method of claim 10, wherein the macro-context is a vector representing weights corresponding to the use of vocabulary terms from a list of topical entries.

13. The method of claim 10, wherein the micro-contexts represent a list of words most closely reflecting the content of the contexts of information in the repository.

14. The method of claim 10, wherein receiving a query from a user further comprises receiving additional information from a user selected from the group consisting of previous queries by the user, previous responses to previous queries from a user, previous results from browsing by a user, and documents provided by a user to establish contexts.

15. The method of claim 10, wherein providing a micro-context further comprises calculating a multiplication of at least two macro-context vectors to provide a mathematical value reflecting a correspondence of a query with a vocabulary list of topical entries.

16. The method of claim 10, wherein locating further comprises comparing a parameter reflecting at least one context associated with the query to a corresponding parameter corresponding to a context of selected information from the repository of information.

17. The method of claim 16, wherein the context compared is selected from macro-context and micro-context.

18. The method of claim 10, wherein the database comprises a plurality of fields of text associated with at least one of a web page, a web site, or a group of web pages grouped on a web site under a heading.

19. The method of claim 10, wherein the repository of information comprises a plurality of terms and a plurality of topical entries, each term of the plurality of terms corresponding to a topical entry of the plurality of topical entries.

20. The method of claim 10, wherein locating in a database information comprises comparing and matching the macro and micro-contexts of the database with the macro and micro-contexts of the query.

* * * * *